United States Patent [19]

Charles et al.

[11] Patent Number: 5,150,775

[45] Date of Patent: Sep. 29, 1992

[54] STEER-SENSITIVE VARIABLE DAMPER AND METHOD UTILIZING A RING VALVE

[75] Inventors: Harlan W. Charles, Harper Woods; Larry D. Miller, Rochester Hills, both of Mich.

[73] Assignee: General Motors Corporation, Detroit, Mich.

[21] Appl. No.: 810,058

[22] Filed: Dec. 19, 1991

[51] Int. Cl.⁵ .................... B60G 17/00; B62D 6/06
[52] U.S. Cl. ........................ 188/299; 188/319; 188/322.13; 188/322.15; 188/322.19; 188/315; 188/317; 188/322.14
[58] Field of Search ............. 188/299, 319, 322.13, 188/281, 282, 280, 318, 317, 322.14, 315, 314, 321.11, 278, 322.15, 322.22, 322.19, 285, 286, 287; 280/707, 702, 705

[56] References Cited

U.S. PATENT DOCUMENTS

| 3,827,538 | 8/1974 | Morgan | 188/319 |
| 4,520,908 | 6/1985 | Carpenter | 188/319 |
| 4,685,545 | 8/1987 | Fannin et al. | 188/299 |
| 4,757,884 | 7/1988 | Fannin et al. | 188/319 |
| 4,789,051 | 12/1988 | Kruckemeyer et al. | 188/299 |
| 4,800,994 | 1/1989 | Imaizumi et al. | 188/319 |
| 4,800,995 | 1/1989 | Bernhardt et al. | 188/319 |
| 4,821,851 | 4/1989 | Kruckemeier et al. | 188/319 |
| 4,826,205 | 5/1989 | Kouda et al. | 280/703 |
| 4,948,163 | 8/1990 | Kikushima et al. | 280/707 |
| 5,080,205 | 1/1992 | Miller et al. | 188/299 |

FOREIGN PATENT DOCUMENTS

3737173-A1 5/1989 Fed. Rep. of Germany ...... 188/319

Primary Examiner—Douglas C. Butler
Attorney, Agent, or Firm—A. Michael Tucker

[57] ABSTRACT

A hydraulic damper for use with a vehicular suspension system includes a reciprocating piston rod and piston in an inner cylinder. A piston valving is carried by the piston and controls the flow of fluid between upper and lower chambers of the inner cylinder. A base valving assembly controls the flow of fluid from the inner cylinder to a reservoir. A plurality of circumferentially-spaced slits are provided in the inner cylinder adjacent the base valve assembly. A control wheel having a plurality of openings corresponding to the slits is mounted inside the inner cylinder and rotatably fixed to the piston. As the vehicle is steered, rotation of the inner cylinder with respect to the control wheel selectively aligns the slits with the openings to permit fluid flow from the lower chamber to the reservoir, thereby providing steer-sensitive variable damping.

31 Claims, 5 Drawing Sheets

STEER-SENSITIVE VARIABLE DAMPER AND METHOD UTILIZING A RING VALVE

CROSS-REFERENCE TO RELATED APPLICATIONS

The present invention is related to the inventions of applications Ser. No. 07/558,284, filed Jul. 26, 1990, now U.S. Pat. No. 5,080,205, Ser. No. 07/779,742, filed Oct. 21, 1991; and Ser. No. 07/790,993, filed Nov. 12, 1991.

BACKGROUND OF THE INVENTION

1. Field of the Invention

The present invention related generally to hydraulic dampers for vehicular suspension systems. In particular, this invention is concerned with a damper having a reciprocating piston and piston rod mounted in a fluid-filled inner cylinder which provides variable damping dependent upon the rotation of an attached wheel assembly.

2. BRIEF DESCRIPTION OF THE RELATED ART

Hydraulic dampers, including shock absorbers and struts, are well-known in vehicular suspension systems. The rate of damping of a hydraulic damper is often tuned by a piston valving assembly and/or a base valve assembly. Conventional piston and base valving assemblies employ various disk packs and spring-biased blow-off elements. During compression and rebound strokes of a damper, fluid flow through these valving assemblies determines the type of damping characteristic produced by the damper.

Many constructions have been developed to provide variable damping. In particular, it is well-known to provide a rotatable plate in a piston valving assembly to change the size of an orifice or other element to alter fluid flow through a piston valving assembly. Oftentimes, an electric motor is used to rotate a valve plate in a piston assembly.

The art continues to seek improvements. It is desirable to provide a variable damper to provide different damping rates for different driving conditions. In particular, during straight-ahead motion of a vehicle, a "soft" ride increases the comfort of passengers. During a steering motion when the vehicle wheels are turned, a "firm" damping rate provides greater control of the vehicle. It is desirable to provide a damper which can vary the damping rate dependent upon these driving conditions.

SUMMARY OF THE INVENTION

The present invention includes a hydraulic damper for use with a vehicular suspension system. The present damper provides variable damping dependent upon the turning motion of an attached wheel assembly. The valving means is an economical system which can be incorporated into conventional shock absorber and strut components. During straight-ahead driving a soft damping rate is provided. During a turning or cornering motion, firm damping enhances control of the vehicle.

In a preferred embodiment, the present invention includes a hydraulic damper for use with a vehicular suspension system. The damper includes a reciprocating piston rod and piston in an inner cylinder. A piston valving means is carried by the piston and controls the flow of fluid between upper and lower chambers of the inner cylinder. A base valving assembly controls the flow of fluid from the inner cylinder to a reservoir. A plurality of circumferentially-spaced slits are provided in the inner cylinder adjacent the base valve assembly. A control wheel having a plurality of openings corresponding to the slits is mounted inside the inner cylinder and rotatably fixed to the piston. As the vehicle is steered, rotation of the inner cylinder with respect to the control wheel selectively aligns the slits with the openings to permit fluid flow from the lower chamber to the reservoir, thereby providing steer-sensitive variable damping.

DETAILED DESCRIPTION OF THE DRAWINGS

Figure 1:
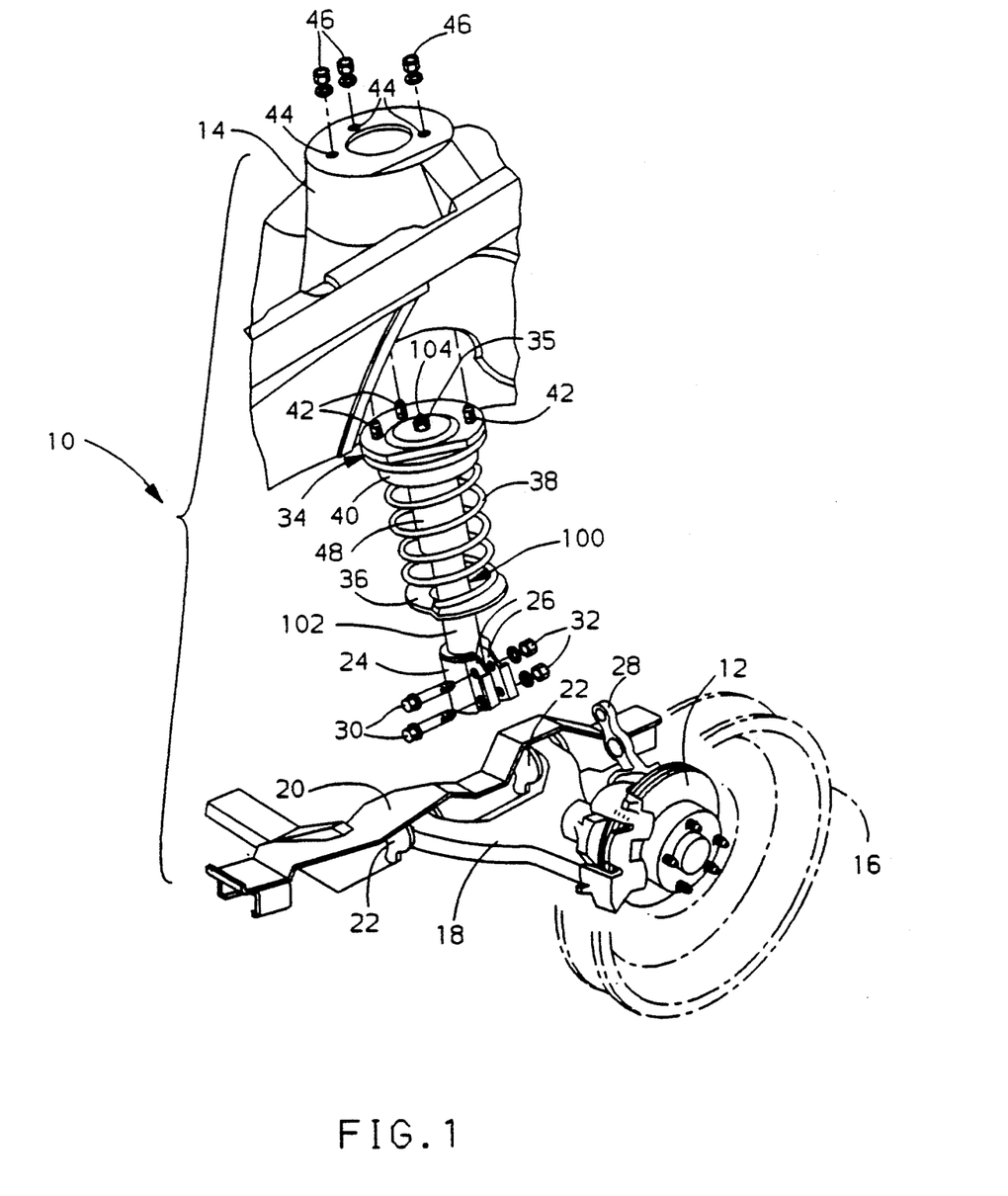
FIG. 1 is an exploded perspective view of an automotive suspension system incorporating a first embodiment of the present steer-sensitive variable damper operatively mounted between a vehicle body and a road wheel assembly.

FIG. 1 illustrates a vehicular suspension system indicated generally at 10. A steerable suspension damper indicated generally at 100 is operatively mounted between a spindle and hub assembly 12 and a mounting tower 14 formed in a vehicular body. The spindle and hub assembly 12 rotatably supports a wheel 16 and is mounted on the outer end of a control arm assembly 18 by a conventional ball joint (not illustrated). The control arm assembly 18 is pivotally mounted at its inboard end to the vehicular frame 20 by pivot shafts 22.

The damper 100 includes a cylindrical reservoir tube 102 mounted at its lower end within a partially cylindrical mounting bracket 24 having radially extending flanges 26 that are spaced from one another in side-by-side relationship to receive an upstanding arm 28 of the spindle and hub assembly 12. Threaded fasteners 30 extend through aligned openings in the mounting bracket flanges 26 and arm 28 and receive nuts 32 to secure the reservoir tube 102 in the mounting bracket 24.

A piston rod 104 telescopically projects from an upper end of the reservoir tube 102 into attachment with a strut mounting assembly 34 and is secured thereto by a nut 35 threaded on the end of the piston rod 104. A particular strut mounting assembly suitable for this application is disclosed in U.S. Pat. No. 4,256,292 issued Mar. 17, 1981 and titled "Resilient Mount For MacPherson Strut." U.S. Pat. No. 4,256,292 is assigned to the present assignee and hereby incorporated by reference.

A lower spring seat 36 is secured to the reservoir tube 102 and mounts a lower end of a helical suspension spring 38. The upper end of the suspension spring 38 is mounted on an upper spring seat 40 of the strut mounting assembly 34. Attachment bolts 42 project upwardly from the strut mounting assembly 34 through complementary openings 44 in the mounting tower 14 to receive nuts 46 which secure the strut mounting assembly 34 to the vehicular body. A cylindrical dust shield 48 is secured to the strut mounting assembly 34 and covers the extended portion of the piston rod 104.

The strut mounting assembly 34 permits the rotation of the reservoir tube 102 with the spindle and hub assembly 12 in a conventional manner whenever the wheel 16 is turned to steer the vehicle. Concurrently, the piston rod 104 is secured to the strut mounting assembly 34 by the nut 35 and remains fixed relative to the vehicular body, thereby resulting in relative rotational motion between the reservoir tube 102 and the piston rod 104.

Figure 2:
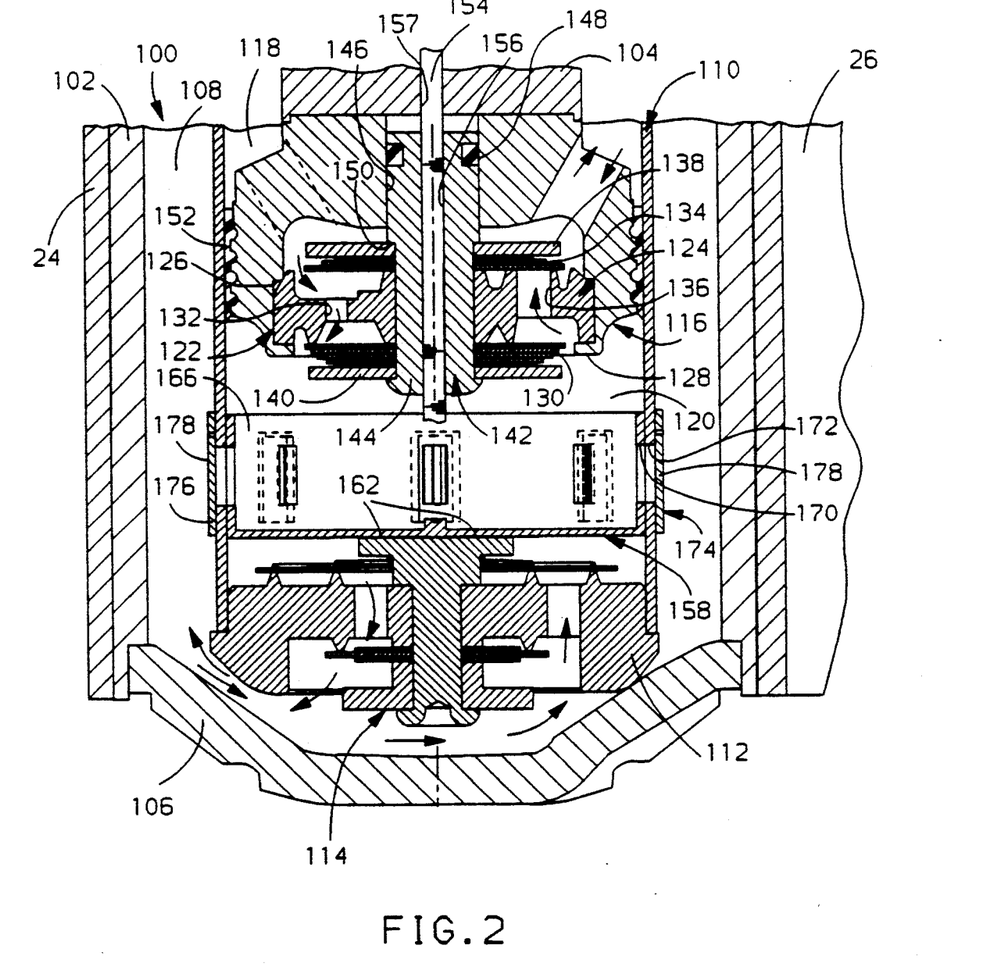
FIG. 2 is an axial sectional view of a lower portion of the damper of FIG. 1 removed from the suspension system for purposes of clarity of illustration.

The lower portion of the damper 100 is illustrated in FIG. 2 and removed from the suspension system 10 of FIG. 1 and purposes of clarity of illustration. As described above, the damper 100 includes the cylindrical reservoir tube 102 mounted in the partially cylindrical bracket 24. A base cup 106 is welded to the closes the lower end of the reservoir tube 102. The reservoir tube 102 surrounds and forms a fluid reservoir 108 with an inner cylinder 110. A cylinder end 112, fitted to and closing the inner cylinder 110, is seated in the base cup 106. A base valve assembly 114 is mounted on the cylinder end 112 and controls the flow of fluid passing between the interior volume of the inner cylinder 110 and the reservoir 108 as described below.

A piston indicated generally at 116 is mounted to a lower end of the cylindrical piston rod 104 by any suitable means. The piston 116 divides the interior volume of the inner cylinder 110 into an upper chamber 118 and a lower chamber 120. The piston 116 carries a piston valving assembly 122 to control the flow of fluid between the upper and lower chambers 118, 120 as described below. The piston valving assembly 122 includes a cylindrical orifice plate 124 peripherally secured between an inner locator shoulder 126 and a radially inwardly coined annular skirt 128. A lower valve spring disk pack 130 comprises of a series of flat washer-like valve disks of spring steel having decreasing diameters top to bottom is mounted adjacent to a bottom surface of the orifice plate 124 to deflect downwardly in response to hydraulic fluid traveling through passage 132 during the rebound stroke.

An upper valve spring disk pack 134 similar to disk pack 130 is comprised of a series of flat washer-like valve disks mounted adjacent a top surface of the orifice plate 124. The upper valve spring disk pack 134 deflects in response to hydraulic fluid traveling through passage 136 during the compression stroke. The spring disk packs 130, 134 are held in operative position between upper and lower limit plates 138, 140 by a centralized mounting connected 142 having a lower coined end 144 engaging the lower limit plate 140. The connector 142 projects downwardly from an axial channel 146 provided in the piston 116. The connector 142 is secured by any suitable means and does not rotate along its axis with respect to the piston 116. An O-ring seal 148 is carried on the connected 142 and provides a seal against the axial channel 146. An annular step 150 in the connector 142 engages the upper limit plate 138. An annular sealing band 152, preferably formed from polytetrafluoroethylene, is provided around the circumference of the piston 116 and forms a seal against an inner surface of the inner cylinder 110.

A control shaft 154 having a rectangular cross section is received in a central axial opening 156 in the connector 142. The opening 156 has a complementary rectangular cross section and forms a driving fit between the connector 142 and the control shaft 154 so that rotation of the control shaft 154 along its axis is not permitted with respect to the connector 142, the piston 116 and the piston rod 104. The control shaft 154 extends upwardly into a complementary axial opening 157 in the piston rod 104 a sufficient length to accommodate the stroking range of the piston rod 104. As the piston 116 and piston rod 104 reciprocate in the inner cylinder 110, the control shaft 154 is axially slidably received in openings 156 and 157.

A control wheel 158 is provided at the lower end of the control shaft 154 adjacent the base valve assembly 114. The control wheel 158 is rotatably fixed with respect to the control shaft 154 and can be formed integrally with the control shaft 154 if desired.

Figure 3:
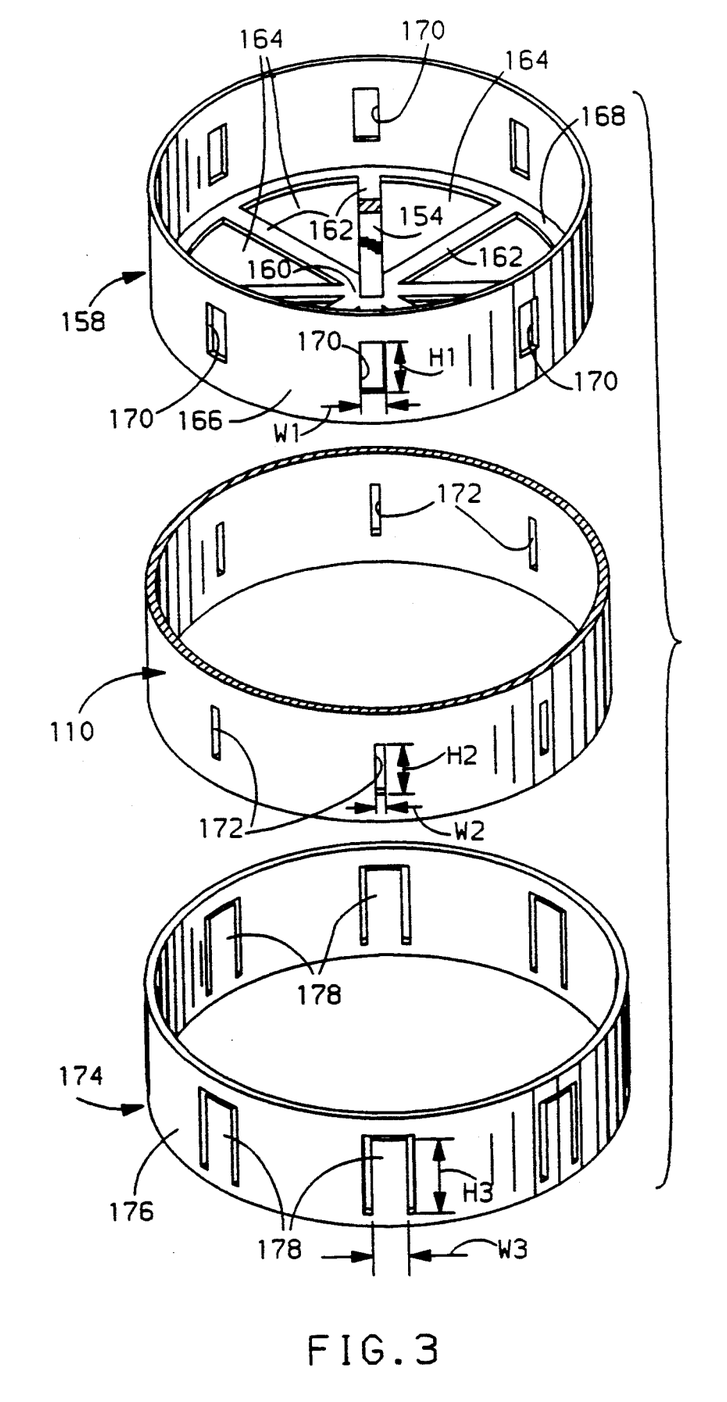
FIG. 3 is an exploded perspective view of a control wheel, a portion of an inner cylinder and a ring valve from the damper of FIG. 2 illustrating alignable fluid openings.

As illustrated best in FIG. 3, the control wheel 158 includes a base portion 160 having a plurality of radial spokes 162 with pie-shaped openings 164 provided between the spokes 162 to permit fluid to flow through the base portion 160 and reach the piston and base valve assemblies 122, 114. An annular wall 166 projects upwardly from a circumferential wall 168 connecting the terminating ends of each spoke 162. A plurality of circumferentially-spaced openings or slots 170 are provided in the annular wall 166. Preferably, each opening 170 has an axial height H1 and a circumferential width W1.

A plurality of circumferentially-spaced slits 172 are provided in the inner cylinder 110 to correspond with the openings 170. Each slit 172 has a height H2 similar to the height H1 of the openings 170. However, the width W2 of each slit 172 is preferably less than the width W1 of each opening 170.

A ring valve 174 includes an annular band or wall 176 fitted onto the outer surface of the inner cylinder 110 in the region of the slits 172 as illustrated in FIG. 2. A plurality of circumferentially-spaced resilient tabs 178 are provided in the wall 176 to correspond with the slits 172. Preferably, the height H3 of each tab 178 is at least equal to height H2, while the width W3 of each tab 178 is at least equal to width W2. Preferably, each tab 178 is integrally formed with the wall 176. As described below, the tabs 178 resiliently deflect or bend radially outwardly to permit the one-way passage of fluid from the lower chamber 120 to the reservoir 108.

In operation, the upward and downward motion of the vehicular suspension system 10 due to road inputs results in compression and rebound of the damper 100, and specifically, reciprocation of the piston 116 and the piston rod 104 in the inner cylinder 110. Fluid travels between the upper and lower chambers 118, 120 through the piston valving assembly 122 in a well-known manner. During a compression stroke, fluid displaced by the piston rod 104 volume travels from the lower chamber 12 to the reservoir 108 through the control wheel 158 and/or the base valve assembly 114. During a rebound stroke, fluid returns from the reservoir 108 to the lower chamber 120 through the base valve assembly 114 only.

When the vehicle wheels and tires are aligned to provide straight movement of the vehicle, the openings 170 in the control wheel 158 are aligned with the slits 172 in the inner cylinder 110 as illustrated in FIG. 2. As fluid passes through the slits 172, the tabs 178 are resiliently bent radially outwardly at their top ends to permit fluid to reach the reservoir 108. The area of slits 172 and the resiliency of the tabs 178 are selected such that a relatively greater amount of fluid passes from the lower chamber 120 to the reservoir 108 through the slits 172 than travels through the base valve assembly 114.

When the wheels and tires are turned with respect to the body to steer the vehicle, the turning motion is translated through the spindle and hub assembly 12 and the mounting bracket 24 to the reservoir tube 102, the cylinder end 112 and the inner cylinder 110. At such time, the rotation of the inner cylinder 110 with respect to the rotationally fixed control wheel 158 and piston 116 is such that the slits 172 are no longer aligned with the openings 170, thereby forcing all flow from the lower chamber 120 to the reservoir 108 through the base valve assembly 114.

Regardless of the position of the wheels, fluid returns from the reservoir 108 through the base valve assembly 114 to reach the lower chamber 120 in a well-known manner. The tabs 178 act as check valves and do not permit the flow of fluid from the reservoir 108 to the lower chamber 120 at any time.

As described above, the present damper 100 provides a two-stage variable damper. The first stage occurs when the openings 170 are aligned with the slits 172, thereby permitting a relatively greater flow of fluid to the reservoir 108 and providing for a "soft" damping rate. The second stage occurs when the openings 170 and the slits 172 are not aligned due to the rotation of the inner cylinder 110 with respect to the control wheel 158. In the second stage, a "firm" damping rate occurs as fluid passes at a relatively restricted rate from the lower chamber 120 to the reservoir 108 only through the base valve assembly 114.

Depending upon the degree of rotation imparted by the spindle and hub assembly 12, a range of damping characteristics can be achieved with the damper 100. For example, openings 170 and slits 172 can be sized to begin restricting fluid flow from the lower chamber 120 to the reservoir 108 with as little as 3-5 degrees of rotation of the reservoir tube 102.

Figure 4:
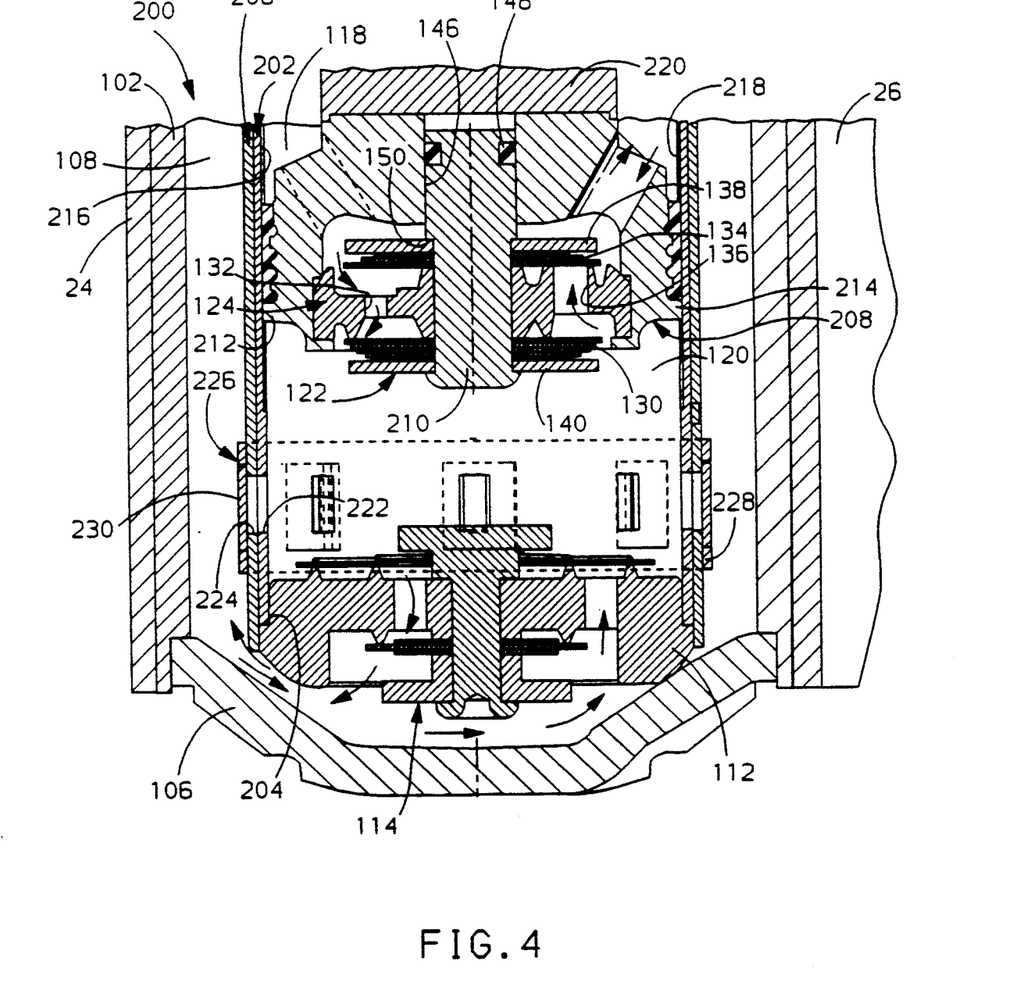
FIG. 4 is an axial sectional view similar to FIG. 2 of a lower portion of a second embodiment of a steer-sensitive variable damper.
Figure 5:
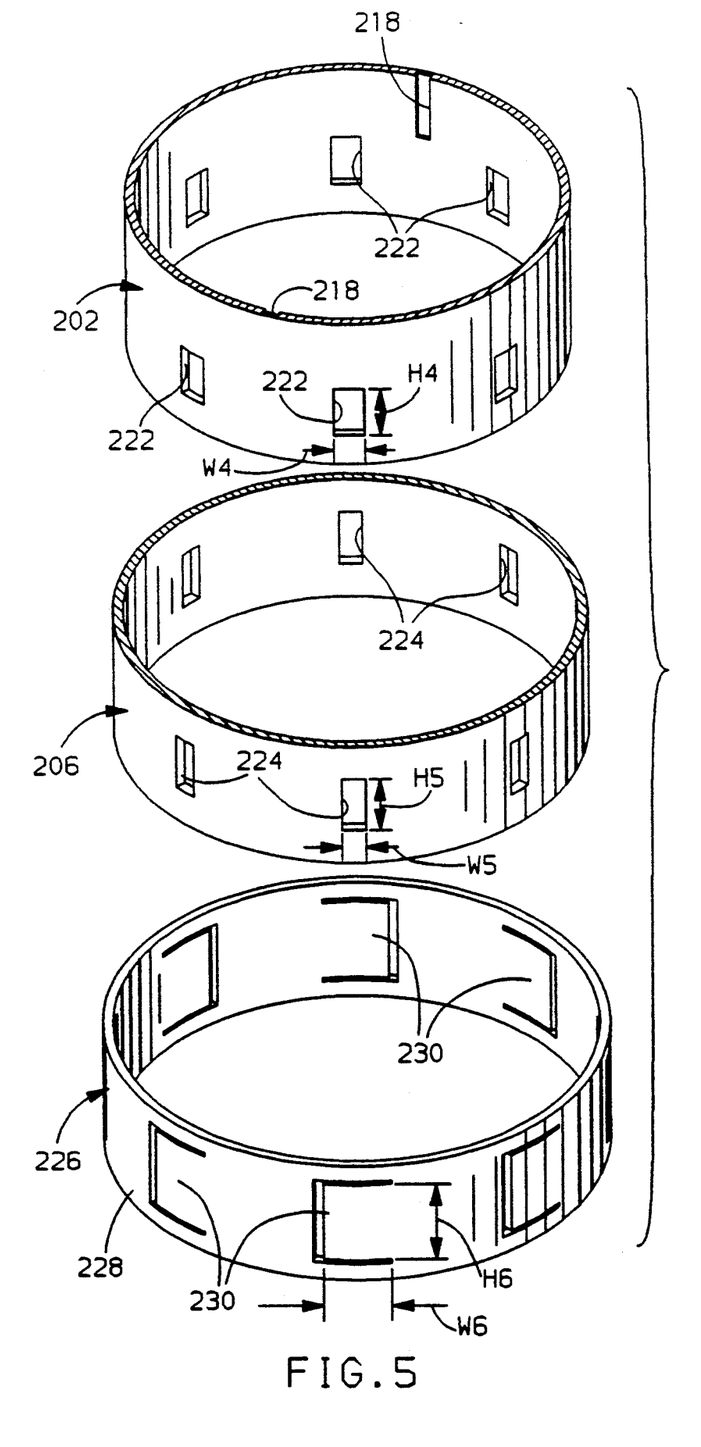
FIG. 5 is an exploded perspective view of portions of inner and outer cylinders and a ring valve from the damper of FIG. 4 illustrating alignable fluid openings.

A second embodiment of the present steer sensitive variable damper is indicated generally at 200 and illustrated in FIGS. 4 and 5. Like reference numerals are used for like elements in embodiments 100 and 200.

The damper 200 includes a reservoir tube 102 closed by a base cup 106 and mounted in a bracket 24. An inner cylinder 202 is slidably positioned on an annular step 204 of a cylinder end 112. An outer cylinder 206 is fixedly secured to the cylinder end 112 and rotatably slide over the outer surface of the inner cylinder 202 as described below. A base valve assembly 114 for controlling fluid flow between the lower chamber 120 and the reservoir 108 is provided on the cylinder end 112.

A piston 208 carries piston valving 122 for controlling fluid flow between the upper chamber 118 and the lower chamber 120. A connector 210 holds limit plates 138 and 140 in place. A pair of outwardly-projecting circumferential tabs 212, 214 are provided on the piston 208. A pair of complementary longitudinal slots 216, 218 are provided on an inner surface of the inner cylinder 202 to receive the tabs 212, 214. As the piston 208 and piston rod 220 reciprocate, the tabs 212, 214 slide axially along the lengths of respective slots 216, 218. When the vehicle wheels are steered, the outer cylinder 206 rotates and moves with the cylinder end 112, the reservoir tube 102 and the bracket 24, while the tabs 212, 214 cause the inner cylinder 202 to remain rotatably fixed. Thus, relative rotation occurs between the inner and outer cylinders 202, 206.

As illustrated best in FIG. 5, a plurality of circumferentially-spaced openings 222 having a height H4 and width W4 are provided in the inner cylinder 202, while circumferentially-spaced slits 224 having a height H5 and width W5 are provided in the outer cylinder 206. A valve ring 226 including an annular band or wall 228 having preferably integral resilient tabs 230 is fitted over the outer surface of the outer cylinder 206. Each tab 230 has a height H6 and a width W6. Preferably, H4 and H5 are similar, while H6 is at least equal to H5. W4 is preferably greater than W5, while W6 is at least equal to W5.

When the vehicle wheels are positioned for straight movement, the openings 222 are aligned with slits 224 so that a greater amount of fluid flows through the slits 224 and tabs 230 than travels through the base valve assembly 114. When the wheels are turned, the turning motion is translated to the reservoir tube 102, the cylinder end 112 and the outer cylinder 206. The inner cylinder 202 remains rotationally fixed with respect to the piston 208 via the tabs 212, 214 and respective slots 216, 218. As the outer cylinder 206 rotates, the slits 224 are no longer aligned with openings 222 so that fluid flows from the lower chamber 120 to the reservoir 108 through the base valve assembly 114 only.

Regardless of the position of the wheels, fluid returns from the reservoir 108 through the base valve assembly 114 in a well-known manner. Tabs 230 act as check valves and do not permit the flow of fluid from the reservoir 108 to the lower chamber 120.

The present invention provides an economical variable damper which is sensitive to the steering motion in a wheel assembly without the use of electric actuators and/or sensors. During straight-ahead driving, the damping of the present dampers 100 and 200 can be tuned to provide a soft and comfortable ride. However, during turning or cornering, when the wheel assembly is rotated, fluid flow from the lower chamber 120 to the reservoir 108 is restricted to the base valve assembly 114, thereby producing a stiffer ride which can improve handling of a vehicle.

Although the present invention has been described with reference to preferred embodiments, workers skilled in the art will recognize that changes may be made in form and detail without departing from the spirit and scope of the invention.

The embodiments of the invention in which an exclusive property or privilege is claimed are defined as follows:

1. A hydraulic damper for controlling the compression and rebound action of a vehicular suspension spring, the damper comprising:
   (a) a reservoir tube connected to a steerable wheel assembly;
   (b) an inner cylinder fixedly mounted within the reservoir tube and cooperating therewith to form a reservoir for a damper fluid contained within the reservoir tube and the inner cylinder;
   (c) base valve means operatively mounted at one end of the inner cylinder for controlling the flow between the inner cylinder and the reservoir tube;

(d) a piston rod operatively mounted for reciprocating movement in the inner cylinder and extending through an upper end of the damper;

(e) a piston secured to an inner end of the piston rod and dividing the interior of the inner cylinder into upper and lower chambers, the piston slidably mounted in the inner cylinder for both reciprocable and rotary motion with respect to the inner cylinder;

(f) piston valving means in the piston establishing a restricted flow path through the piston between the upper and lower chambers during compression and rebound of the damper;

(g) slit means provided in a portion of the inner cylinder in fluid communication with the lower chamber; and (h) control valving means establishing a variable flow from the lower chamber to the reservoir through the slit means, the control valving means actuated by the relative rotation between the reservoir tube and the piston provided by a steering motion of a vehicle.

2. The damper specified in claim 1 wherein the control valving means comprises:

(a) a control shaft rotatably fixed to the piston and projecting toward the base valve means; and (b) a control wheel rotatably fixed to the control shaft having fluid opening means;

whereby rotation of the reservoir tube and the inner cylinder selectively aligns the opening means with the slit means to vary fluid flow.

3. The damper specified in claim 2 wherein:

(a) the slit means includes a plurality of circumferentially-spaced slits; and (b) the control wheel includes an annular wall, slidably mounted at an inner surface of the inner cylinder, having a plurality of circumferentially-spaced openings selectively alignable with the slits.

4. The damper specified in claim 3 wherein the control wheel includes a base portion having openings to permit fluid flow.

5. The damper specified in claim 2 wherein the control shaft and the control plate are integrally formed.

6. The damper specified in claim 1 wherein the control valving means comprises a second cylinder, slidably mounted at an inner surface of the inner cylinder and rotatably fixed to the piston, having fluid opening means, whereby rotation of the reservoir tube and the inner cylinder selectively aligns the opening means with the slit means to vary fluid flow.

7. The damper specified in claim 6 wherein:

(a) the piston includes at least one circumferential tab; and (b) the second cylinder includes a longitudinal slot for receiving the tab.

8. The damper specified in claim 1 including check valve means to permit only one-way flow through the slit means.

9. The damper specified in claim 8 wherein the check valve means includes an annular band, fitted over the inner cylinder, having resilient tab means corresponding to the slit means.

10. A system for controlling the compression and rebound action of a vehicular suspension spring with a variable hydraulic damper, the system comprising:

(a) a reservoir tube;

(b) a fluid-filled cylinder fixedly mounted within the reservoir tube and cooperating therewith to form a fluid reservoir;

(c) base valve means mounted at one end of the cylinder for controlling fluid flow between the cylinder and the reservoir tube;

(d) a piston slidably mounted in the cylinder for both reciprocable and rotary motions and dividing the interior of the cylinder into upper and lower chambers;

(e) a piston rod rotatably connected at one end to the piston rod and extending from the reservoir tube;

(f) means for rotating the cylinder along its axis in response to a steering input to the vehicle;

(g) means for rotatably fixing the piston rod to the vehicle;

(h) slit means provided in a portion of the inner cylinder in fluid communication with the lower chamber; and (i) control valving means establishing a variable flow from the lower chamber to the reservoir, the control valving means rotatably fixed to the piston, wherein the slit means is opened and closed by the relative rotation between the control valve means and the inner cylinder in response to a steering input to the vehicle.

11. The system specified in claim 10 wherein the control valving means comprises:

(a) a control shaft rotatably fixed with respect to the piston; and (b) a slotted control wheel, rotatably fixed to the control shaft adjacent the base valve means, having slot means alignable with the slit means.

12. The system specified in claim 10 wherein the control valve means comprises a second cylinder, slidably mounted at an inner surface of the inner cylinder, having slot means alignable with the slit means.

13. The system specified in claim 10 including check valve means to permit only one-way flow through the slit means.

14. In combination, an axially-rotatable hydraulic suspension damper with control valve means, the damper including a reservoir tube, an inner cylinder connected to the reservoir tube, a piston reciprocally and rotatably mounted in the inner cylinder and dividing an interior of the inner cylinder into upper and lower chambers, a piston rod secured to the piston and fixed to a vehicular body, piston valving means for providing a restricted flow through the piston, base valve means mounted to the inner cylinder for providing a restricted flow from the inner cylinder to a reservoir, and slit means provided in the inner cylinder in fluid communication with the lower chamber, the control valve means including an annular wall, slidably mounted at an inner surface of the inner cylinder in the lower chamber and rotatably fixed to the piston, having a plurality of circumferentially-spaced openings selectively alignable with the slit means as the damper is rotated along its axis.

15. The combination specified in claim 14 wherein:

(a) the annular wall forms a circumferential boundary of a wheel; and (b) a control shaft is rotatably fixed at one end to the wheel and at the other end to the piston.

16. The combination specified in claim 14 wherein:

(a) the piston includes at least one circumferential tab; and (b) the annular wall includes a longitudinal slot for receiving the tab.

17. The combination specified in claim 14 including check valve means to permit only one-way flow through the slit means.

18. A method for varying the damping force of a hydraulic damper in a vehicular suspension system as a vehicle is steered, the damper of the type having a fluid-filled cylinder divided into upper and lower chambers by a reciprocable piston slidably mounted in the cylinder, the cylinder cooperating with a reservoir tube to form a reservoir, the method comprising the steps of:
 (a) rotatably fixing the piston to the vehicle;
 (b) rotatably fixing the cylinder to a steerable wheel assembly;
 (c) providing slit means in the cylinder in fluid communication with the lower chamber;
 (d) rotatably fixing control valve means to the piston in the lower chamber adjacent the slit means; and
 (e) rotating the wheel assembly to selectively align the control valve means with the slit means, thereby varying fluid flow from the lower chamber to the reservoir.

19. The method specified in claim 18 wherein the wheel assembly is rotated by steering the vehicle.

20. The method specified in claim 18 wherein:
 the control valve means comprises an annular wall, slidably mounted against an inner surface of the lower chamber, having a plurality of openings selectively alignable with the slit means.

21. The method specified in claim 20 wherein:
 (a) the annular wall forms a circumferential boundary of a wheel; and
 (b) a control shaft is rotatably fixed at one end to the wheel and at the other end to the piston.

22. The method specified in claim 20 wherein:
 (a) the piston includes at least one circumferential tab; and
 (b) the annular wall includes a longitudinal slot for receiving the tab.

23. The method specified in claim 18 including the step of checking the reverse flow of fluid from the reservoir to the lower chamber through the slit means.

24. The method specified in claim 18 including the step of fitting an annular band having flexible tabs on an outer surface of the cylinder to permit only one-way flow through the slit means.

25. A method for varying damping of a sprung vehicle in a suspension system, the method comprising the steps of:
 (a) installing a hydraulic damper between sprung and unsprung portions of a vehicle, the damper including a fluid-filled cylinder mounted in and rotatably fixed to a reservoir tube;
 (b) attaching the reservoir tube to a steerable wheel assembly;
 (c) dividing an interior of the cylinder into upper and lower chambers with a reciprocable and rotatable piston;
 (d) rotatably fixing the piston to a sprung portion of the vehicle;
 (e) restricting fluid flow through internal passage means in the piston with a piston valving assembly;
 (f) rotatably fixing base valve means to the cylinder for controlling fluid flow between the lower chamber and a reservoir;
 (g) forming slit means in the cylinder in communication with the lower chamber; and
 (h) rotatably fixing control valve means having openings to the piston in the lower chamber adjacent the slit means; and
 (i) rotating the wheel assembly to selectively align the openings of the control valve means with the slit means to vary fluid flow from the lower chamber to the reservoir.

26. The method specified in claim 25 wherein:
 the control valve means comprises an annular wall, slidably mounted against an inner surface of the lower chamber, having a plurality of openings selectively, alignable with the slit means.

27. The method specified in claim 26 wherein:
 (a) the annular wall forms a circumferential boundary of a wheel; and
 (b) a control shaft is rotatably fixed at one end to the wheel and at the other end to the piston.

28. The method specified in claim 26 wherein:
 (a) the piston includes at least one circumferential tab; and
 (b) the annular wall includes a longitudinal slot for receiving the tab.

29. The method specified in claim 25 including the step of checking the reverse flow of fluid from the reservoir to the lower chamber through the slit means.

30. A method of varying fluid flow in a steerable hydraulic damper of a vehicular suspension system, the method comprising the steps of:
 (a) providing a fluid-filled cylinder;
 (b) dividing an interior of the cylinder into first and second chambers with a piston slidably mounted in cylinder;
 (c) fixedly connecting a first end of a piston rod to the piston and fixedly connecting a second end of the piston rod to a vehicle;
 (d) restricting fluid flow through the piston between the first and second chambers with piston valving means;
 (e) forming slit means in the cylinder in fluid communication with the second chamber;
 (f) establishing a variable flow between the second chamber and a reservoir with control valve means rotatably fixed with respect to the piston;
 (g) rotating the cylinder as the vehicle is steered to selectively align the control valve means with the slit means to vary flow from the second chamber to the reservoir.

31. A method of using a hydraulic damper in a vehicular suspension system, the method comprising the steps of:
 (a) mounting the damper having a fluid-filled cylinder mounting a reciprocable piston between sprung and unsprung portions of a vehicle;
 (b) rotatably fixing the piston to the sprung portion of the vehicle;
 (c) rotatably fixing the cylinder to the unsprung portion of the vehicle;
 (d) providing first and second fluid chambers in the cylinder separated by the piston;
 (e) providing slit means in the cylinder in fluid communication with the second chamber;
 (f) restricting fluid flow between the second fluid chamber and a reservoir as the piston reciprocates with a base valve means rotatably fixed to the cylinder;
 (g) providing variable fluid flow between the second fluid chamber and the reservoir with slotted control valve means rotatably fixed to the piston; and
 (h) rotating the cylinder to selectively align the slotted control valve means with the slit means to provide variable damping from the damper.

* * * * *